United States Patent
Mumme

(10) Patent No.: US 12,503,377 B2
(45) Date of Patent: Dec. 23, 2025

(54) ADSORBENT FOR MUNICIPAL WASTEWATER TREATMENT

(71) Applicant: CARBOGENICS LTD, Lothian (GB)

(72) Inventor: Jan Mumme, Lothian (GB)

(73) Assignee: Carbogenics LTD, Edinburgh (GB)

( * ) Notice: Subject to any disclaimer, the term of this patent is extended or adjusted under 35 U.S.C. 154(b) by 400 days.

(21) Appl. No.: 17/642,597

(22) PCT Filed: Sep. 7, 2020

(86) PCT No.: PCT/GB2020/052141
§ 371 (c)(1),
(2) Date: Mar. 11, 2022

(87) PCT Pub. No.: WO2021/048527
PCT Pub. Date: Mar. 18, 2021

(65) Prior Publication Data
US 2022/0332600 A1  Oct. 20, 2022

(30) Foreign Application Priority Data
Sep. 13, 2019 (GB) ..................... 1913290

(51) Int. Cl.
B01J 20/30 (2006.01)
B01J 20/04 (2006.01)
(Continued)

(52) U.S. Cl.
CPC ............ C02F 1/283 (2013.01); B01J 20/041 (2013.01); B01J 20/20 (2013.01);
(Continued)

(58) Field of Classification Search
CPC .......... C02F 1/283; C02F 1/488; C02F 11/04; C02F 2101/105; C02F 2101/16;
(Continued)

(56) References Cited

U.S. PATENT DOCUMENTS 1,610,408 A * 12/1926 William ................... B01J 20/20
502/80
4,251,367 A * 2/1981 Santora ................... C02F 11/10
210/779
(Continued)

FOREIGN PATENT DOCUMENTS

| CN | 105970359 A | 9/2016 | | |
|---|---|---|---|---|
| CN | 108525638 A | 9/2018 | | |
| WO | WO-2011097183 A2 * | 8/2011 | ............... | B01J 20/20 |

OTHER PUBLICATIONS

Chen et al., "A novel magnetic biochar efficiently sorbs organic pollutants and phosphate", published in Bioresource Technology, 2011, vol. 102, pp. 716-723. (Year: 2011).*
(Continued)

*Primary Examiner* — Joseph W Drodge
(74) *Attorney, Agent, or Firm* — Foley & Lardner LLP

(57) ABSTRACT

There is described a particulate carbon adsorbent comprising 60 to 90% by wt carbon, wherein the particulate carbon adsorbent is a fibrous pyrolysis product of an organic fraction of waste screenings, and wherein the fibrous pyrolysis product predominantly comprises fibres having a diameter in the range about 10-40 µm and a length in the range about 50-500 µm. A method of manufacture is also described. The particulate carbon adsorbent is useful in of odour prevention in wastewater treatment and other wastewater processes.

7 Claims, 9 Drawing Sheets

(51) Int. Cl.
| | |
|---|---|
| *B01J 20/20* | (2006.01) |
| *B01J 20/28* | (2006.01) |
| *C02F 1/28* | (2023.01) |
| *C02F 1/48* | (2023.01) |
| *C02F 11/04* | (2006.01) |
| *C02F 101/10* | (2006.01) |
| *C02F 101/16* | (2006.01) |
| *C02F 101/32* | (2006.01) |

(52) U.S. Cl.
CPC ... *B01J 20/28004* (2013.01); *B01J 20/28009* (2013.01); *B01J 20/28023* (2013.01); *B01J 20/28064* (2013.01); *B01J 20/28071* (2013.01); *B01J 20/3021* (2013.01); *B01J 20/3078* (2013.01); *C02F 1/488* (2013.01); *C02F 11/04* (2013.01); *B01J 2220/4831* (2013.01); *B01J 2220/4887* (2013.01); *C02F 2101/105* (2013.01); *C02F 2101/16* (2013.01); *C02F 2101/322* (2013.01); *C02F 2303/02* (2013.01); *C02F 2303/06* (2013.01)

(58) Field of Classification Search
CPC ............ C02F 2101/322; C02F 2303/02; C02F 2303/06; C02F 3/28; B01J 20/041; B01J 20/20; B01J 20/28004; B01J 20/28009; B01J 20/28023; B01J 20/28064; B01J 20/28071; B01J 20/3021; B01J 20/3078; B01J 2220/4831; B01J 2220/4887; B01J 2220/46; B01J 2220/4875; Y02E 50/30; B01D 39/2055; B01D 39/2082; B01D 39/2086

See application file for complete search history.

(56) References Cited

U.S. PATENT DOCUMENTS

| | | | | | |
|---|---|---|---|---|---|
| 4,336,141 | A | * | 6/1982 | Santora | ............... C02F 1/465 210/694 |
| 4,341,639 | A | * | 7/1982 | Santora | ............... C02F 1/465 210/769 |
| 5,310,593 | A | * | 5/1994 | Tsujimoto | ............ B01J 20/2803 428/184 |
| 2010/0017604 | A1 | * | 1/2010 | Husa | ........................ H04L 9/12 713/168 |
| 2014/0306148 | A1 | * | 10/2014 | Kolomitsyn | ......... B01J 20/3078 252/175 |
| 2015/0144564 | A1 | * | 5/2015 | Moller | ................... C02F 1/283 210/201 |
| 2015/0144831 | A1 | * | 5/2015 | Mennell | ............... B01J 20/3078 252/62.51 R |
| 2015/0252267 | A1 | * | 9/2015 | Licht | ..................... C10L 5/363 201/8 |
| 2016/0023959 | A1 | * | 1/2016 | Bontchev | ................. C05G 3/80 71/24 |
| 2016/0138048 | A1 | * | 5/2016 | Snyder | .................... C12P 5/023 435/167 |
| 2018/0221851 | A1 | * | 8/2018 | Petruska | ............ B01J 20/28064 |
| 2019/0001299 | A1 | * | 1/2019 | Sturm | ................ B01J 20/28057 |

OTHER PUBLICATIONS

Zhang et al., "Synthesis of porous MgO-biochar nanocomposites for removal of phosphate and nitrate from aqueous solutions", published in Chemical Engineering Journal, 2012, vol. 210, pp. 26-32. (Year: 2012).*

English translation of patent publication Cn 105970359A, published Sep. 28, 2016. (Year: 2016).*

F. Benstoem et al., "Elimination of micropollutants by activated carbon produced from fibers taken from wastewater screenings using hydrothermal carbonization", Journal of Environmental Management, vol. 211, Feb. 4, 2018 (pp. 278-286).

International Search Report and Written Opinion on International Patent Application No. PCT/GB2020/052141, mailed Dec. 7, 2020 (13 pages).

Li Ronghua et al., "Simultaneous capture removal of phosphate, ammonium and organic substances by MgO impregnated biochar and its potential use in swine wastewater treatment", Journal of Cleaner Production, Elsevier, Amsterdam, NL, vol. 147, Jan. 12, 2017 (pp. 96-107).

CN Office Action on CN Appl. No. 202080077297.5 dated Dec. 1, 2023 (23 pages).

CN Office Action on CN Appl. No. 202080077297.5 dated Sep. 30, 2024 (14 pages).

* cited by examiner

Figure 5 A, B
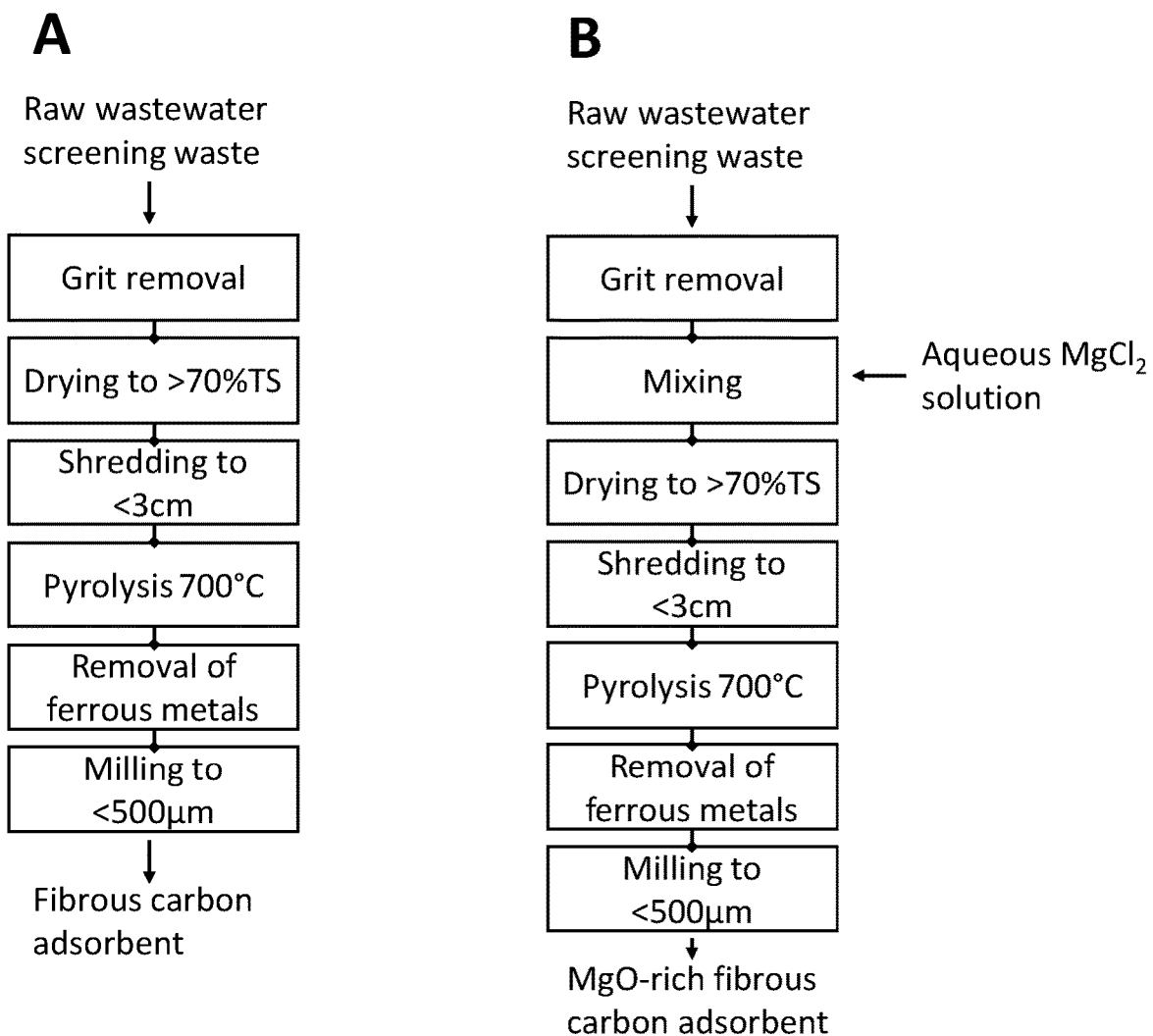

ADSORBENT FOR MUNICIPAL WASTEWATER TREATMENT

CROSS-REFERENCE TO RELATED APPLICATIONS

This application is a U.S. National Stage Application under 35 U.S.C. § 371 of International Patent Application No. PCT/GB2020/052141, filed on Sep. 7, 2020, which claims priority to United Kingdom Patent Application No. 1913290.1, filed on Sep. 13, 2019, the content of each of which is incorporated herein by reference in their entireties The invention relates to the field of wastewater treatment, more specifically to adsorbents used in wastewater treatment.

BACKGROUND OF THE INVENTION

Various types of adsorbents are used in wastewater treatment (WWT) with the aim to remove a variety of mineral and organic pollutants such as phosphate, sulphides, fluorides, dyes, phenols, pesticides, pharmaceuticals and various organic substances grouped as the wastewater's chemical oxygen demand (COD). As discussed, for example in WO2015/077484, wastewater has been treated using biochar, wherein the biochar may be derived from agricultural crop waste, forestry waste, algae, animal or human waste, industrial waste, municipal waste, anaerobic digester waste, plant materials grown for the production of biomass, or a combination thereof. Compared to mineral-based adsorbents (e.g. zeolites and silica) adsorbents that are made from organic precursors allow for easier handling and disposal as they are less abrasive and combustible in regular sludge incinerators. However, common activated carbon adsorbents are usually costly and are often made from resources, such as peat or virgin wood, that have a questionable sustainability.

A potential feedstock for the production of carbon-based adsorbents that is sustainable and has low or no cost is material from wastewater screenings Wastewater screenings are large solid materials that are mechanically separated from the raw wastewater at the inlet of a wastewater treatment plant. They contain a broad variety of materials that can be grouped into mineral solids (e.g. grit, sand, and gravel) and organic solids (e.g. rags, paper, sanitary products, cellulose fibres from toilet paper). Wastewater screenings are usually seen as a problematic waste with no value that is disposed via incineration or landfilling. Benstoem et al. (2018) describes a method to produce activated carbon for the elimination of micropollutants based on paper fibres (toilet paper) taken from wastewater screenings. The described process, which includes recovery of the fibres, hydrothermal carbonisation plus subsequent thermochemical activation, is highly complex and energy and cost intensive. Moreover, the adsorption efficiency of the material produced was lower than that of commercial activated carbon. This makes the commercial viability of the known approaches difficult.

A wide-spread problem in wastewater treatment is the production of bad odours. The odours are mostly caused by the sulphur-based compounds hydrogen sulphide, various organic sulphur compounds (e.g. mercaptans, dimethyl sulphide, carbonyl sulphide and dimethyl disulphide) and ammonia. There are several methods to control odours either by prevention of odour generation within the liquid phase or by containment and treatment of the gases and vapours. In the liquid phase, problematic substances can be oxidised (e.g. aeration with air or oxygen, addition of nitrate or chemical oxidising agents), precipitated (e.g. by ferrous or ferric sulphate and ferrous or ferric chloride) or made less volatile by pH adjustment (e.g. addition of lime). However, all these methods possess significant costs and can interfere with downstream processing of the wastewater.

Moreover, a) aeration is very energy intensive and requires at least 30-60 min hydraulic retention time, b) oxidising agents can be difficult to handle and can cause other bad odours, and c) precipitation and pH adjustment can involve hazardous and corrosive substances which can cause harm to the wastewater treatment plant. Containment and treatment of gases and vapours come with high capital and operational costs and thus are therefore usually limited to most odour-intensive parts of the wastewater treatment plant. An effective way to remove odours from the gas or vapour phase is the use of adsorbents like activated carbon. Activated carbon was also shown to efficiently adsorb odour causing substances in the liquid phase of the wastewater (Hwang et al. 1994). However, because of their high costs, adsorbents are rarely used to bind odour causing components in the liquid phase.

SUMMARY OF THE INVENTION

There is a need for a low-cost non-hazardous adsorbent for the adsorption of odour causing substances in the liquid phase of wastewater treatment. Suitably such adsorbent may be made from a sustainably sourced feedstock. Advantageously the feedstock can be obtained from wastewater treatment screenings such that effectively a looped process is provided—waste screenings of the wastewater treatment are utilised in the process of the wastewater treatment such that the "waste" material generated by the treatment is reduced. The use of the wastewater screenings in the treatment process is advantageous as it can avoid the need for transport of the "waste" screening material offsite and so reduce the environmental impact of such transport and "waste" or treated "waste" material. Advantageously, this reduces the environmental impact of the wastewater treatment, and can increase the efficiency of the treatment process. Advantageously, the use of wastewater screenings in a treatment process may also be financially advantageous and reduce the costs of wastewater treatment. To be economically advantageous, the use of the wastewater screenings in wastewater treatment requires simpler processes to provide suitable adsorbents than presently disclosed in the art. Further the inventors have determined particular wastewater screening material that provide advantageous adsorbents, particularly when processes and then provided at different sizes, for example for use at different parts of the wastewater treatment process.

Accordingly, a first aspect of the present invention provides a particulate carbon adsorbent comprising 60 to 90% by wt carbon, wherein the particulate carbon adsorbent is a fibrous pyrolysis product of an organic fraction of waste screenings, and wherein the fibrous pyrolysis product predominantly comprises fibres having a diameter in the range about 10-40 μm and a length in the range about 50-500 μm In embodiments, the particulate carbon adsorbent in use retains fibrous characteristics of the fibrous pyrolysis product. In alternative embodiments the particulate carbon adsorbent can be provided as a non-fibrous fine ground carbon dust for further use or further processing.

Suitably, the particulate carbon adsorbent is formed by pyrolysis of the organic fraction of wastewater screenings which is predominantly fibrous (natural and synthetic fibres), wherein the wastewater screenings are separated from a wastewater using screens with an aperture between 1 mm and 15 mm. Suitably the wastewater screenings may be from a water treatment plant of municipal wastewater, including a water treatment plant of residential or industrial wastewater, and may also termed "screening waste feedstock".

The term "wastewater screenings" as used herein can also be referred in the art as "screening matter" or "screening waste". Wastewater screenings has the recognised European Waste Catalogue Code EWC 19 08 01.

The term "organic fraction wastewater screenings" as used herein can also be referred in the art as "organic screenings" or "organic screening material". A substance is defined as "organic" when it contains carbon-hydrogen bonds, and is used in the art to distinguish from mineral substances such as sand, gravel and stone, which are also generally found in wastewater feedstocks, and which can be easily separated away by gravity from the organic fraction of the wastewater screenings due to their high material density.

Suitably the fibrous pyrolysis product undergoes de-agglomeration such as grinding or crushing or milling or the like to help to distinguish or isolate the so-formed fibres. De-agglomeration after pyrolysis is advantageous as less material has to be ground down to achieve the same mass of fibres than if grinding occurs pre-pyrolysis. It was unexpected that fibres of utility as an absorbent material could be obtained post-pyrolysis, and that fibre recovery was not required pre-pyrolysis. Additionally, it has been determined that pyrolysis of the fibrous organic fraction of wastewater screening, prior to production of the fibres for use, is simpler to achieve that pre-pyrolysis production/isolation of fibres from screening material.

Advantageously, the fibrous nature of the pyrolysis product produces less dust than non-fibrous powdered carbon adsorbents (e.g. Activated carbon) that have the same particle diameter (sphere diameter vs fibre diameter). The pyrolysis product of the present invention is also easier to separate after use from treated wastewater, both by settling or filtering. Advantageously the pyrolysis product of the present invention can also have a higher sorption efficiency than granulated carbon because the adsorbate has a longer average distance to cross in granulated carbon compared to fibres. Suitably, contaminants may be adsorbed by the fibrous pyrolysis product of the present invention at a higher rate than granulated carbon. Suitably, pores provided in the fibrous pyrolysis product may be less easily blocked that the pores of granulated carbon provided from other sources.

Table 1 indicates a number of suitable characteristics of the carbon fibres of a particulate carbon adsorbent of the present invention determined by microscopic image analysis.

TABLE 1

| Parameter | Unit | Observed Value | Desired Value |
|---|---|---|---|
| Predominant fibre diameters | μm | 10-40 | 10-40 |
| Predominant fibre lengths | μm | 50-500 | |
| Predominant aspect ratio | L/D | 5-50 | >5 |
| Portion of fibres whose length to diameter ratio is >5 | % wt | 80 | >60 |

Table 2 indicates advantageous physical characteristics of carbon adsorbent of the present invention. Suitably these carbon adsorbents can be considered "microporous".

TABLE 2

Porosity characteristics of the carbon adsorbent particles that passed a 125 μm sieve but not a 20 μm sieve determined by nitrogen adsorption technique (Fine dust <20 μm and larger non-fibrous particles are essentially removed prior to analysis).

| Parameter | Unit | Observed Value | Desired Value |
|---|---|---|---|
| BET total surface Area | $m^2/g$ | 254.7 | >200 |
| Micropore Area | $m^2/g$ | 229.7 | >200 |
| Mesopore Area | $m^2/g$ | 14.9 | |
| Share of micropore area in total surface area | % | 90.2 | >80 |
| Total pore volume | $cm^3/g$ | 0.133 | |
| Micropore volume | $cm^3/g$ | 0.092 | |
| Average pore diameter | nm | 2.095 | |

In view of the fibrous shape of the adsorbent particles, particle size (i.e. 20-125 μm) is defined by way of the upper and lower screening aperture.

Thus, optionally, the particulate carbon adsorbent has >60% by weight of the fibres of the particulate carbon adsorbent have an aspect ratio of length/diameter of >5.

Also optionally, the particulate carbon adsorbent has a BET total surface area of >200 m2/g, a micropore area of >200 m2/g and a portion of micropore area in total surface area of >80%.

Suitably, >50% or >60% or >70% or 80% or >90 or >95% or >99% of the carbon adsorbent may have a diameter in the range about 10-40 μm and a length in the range about 50-500 μm. Suitably, >50% or >60% or >70% or 80% or >90 or >95% or >99% of the carbon adsorbent may have the desired properties shown in Table 2. As will be appreciated, de-agglomeration or grinding of the pyrolysis product may be undertaken to provide or further provide the carbon adsorbent with the presence of fibres desired. The particulate carbon adsorbent of the present invention can therefore also be seen as a post-pyrolysis and post-de-agglomerated fibrous product of organic fraction of waste screenings.

Suitably, the particulate carbon adsorbent may be further processed, such that it is provided in the form of a powder or powder as a direct or indirect product of providing the fibres of the pyrolysis product. The carbon particles and/or any further processed product may also be in form of granules, pellets, or pressed into blocks.

Suitably the particulate carbon adsorbent may have a particle size of below 125 μm. Suitably the particulate carbon adsorbent may have a particle size above 125 μm. Suitably, the particulate carbon adsorbent may have a particle size that does not exceed 500 µm. Suitably the particulate carbon adsorbent may comprise a carbon content of about 75% of the dry matter and an ash content of about 19% of the dry matter.

TABLE 3

Chemical characteristics of the particulate carbon adsorbent

| Parameter | Unit | Observed Value | Desired Value |
|---|---|---|---|
| Carbon content | % dry matter | 75.0 | 60-90 |
| Hydrogen content | % dry matter | 1.6 | |
| Nitrogen content | % dry matter | 1.8 | |
| Oxygen content (calculated) | % dry matter | 3.0 | 25 |
| Ash content | % dry matter | 18.6 | <30 |
| Molar H/C ratio | — | 0.26 | <0.7 |
| Molar O/C ratio | — | 0.03 | <0.4 |
| pH value | — | 10.2 | 6-12 |

Suitably the desired low H/C and O/C ratios noted in Table 3 provide a high degree of carbonisation (i.e. high aromaticity and high degree of condensation). Highly aromatic and condensed carbon materials are more chemically and biologically stable. Suitably the particulate carbon adsorbents have a molar H/C ratio of below 0.7 and molar O/C ratio below 0.4. This ensures both i) the carbon adsorbent stays intact wherever it is used in the wastewater treatment process and ii) the spent carbon product (incl. as part of the sewage sludge) can be applied to soils as a soil amender and for carbon sequestration. Typically, it would be expected that screening waste only contains negligible amounts of sulphur.

Suitably pH of the particulate carbon adsorbent may be in the neutral to basic range. pH mainly derives from the lime content from of calcium and magnesium specimen in the carbon product. Optionally, the particulate carbon adsorbent has a pH of approximately 10.

Suitably, the carbon product may also contain water. Directly after production of the pyrolysis product the moisture content will be close to 0%. If left exposed to ambient air the product will draw moisture to a level between 10-20 wt. %. Typically, a moisture content of around 12 to 14%, more particularly about 13.6% may be observed in the product. As mentioned in Example 2, more water can be added (30-50%) with the purpose of mitigating the risk of dusting or self-incineration.

Suitably the particulate carbon adsorbent may comprise a carbon content of around 75% and further comprise one or more of: Calcium (Ca), Magnesium (Mg), and Iron (Fe). Suitably Ca, Mg, and Fe may be provided in an oxidised form. Ca, Mg and Fe can increase the particulate carbon's sorption capacity for organic or mineral contaminants. Ca and Mg also give the carbon adsorbent a pH buffering effect. Fe can be used to the give the carbon adsorbent a magnetic feature so it can be magnetically separated from the wastewater treatment process.

Table 4 is illustrative of advantageous metal concentrations in the particulate carbon adsorbent

TABLE 4

| Element | Unit | Observed Value | Useful Value |
|---|---|---|---|
| Ca | g/kg | 33.3 | 10-100 |
| Mg | g/kg | 4.9 | 4-100 |
| Fe | g/kg | 2.1 | 1-100 |

Suitably at least one or a combination of the Ca, Mg, and Fe may be provided at a concentration as set out in Table 4.

In a preferred embodiment, the concentration of calcium and magnesium in the carbon adsorbent can be as shown in Table 4. This provides an alkaline carbon adsorbent with a pH buffering effect to maintain a high adsorption efficiency at varying pH conditions, particularly at acidic pH.

In a preferred embodiment, the form of the calcium and magnesium can be $CaCO_3$ and $MgO$, respectively. These help to increase the removal rate of pollutants from the wastewater. $CaCO_3$ (calcite) is known to adsorb phosphate (Kitano et al, 1978). MgO when impregnated on biochar was found to increase the capture rate of phosphate, ammonium and organic substances in swine wastewater (Li et al, 2017).

Suitably, a solution of an element to be incorporated in the pyrolysis product may be mixed with the screening waste prior to pyrolysis. For example, a Mg solution (e.g. $MgCl_2$) may be added to the screening waste prior to drying. A uniform distribution of the element may be provided by simultaneous fine-spraying the solution and mixing the screening waste e.g. in drum-type mixer.

Suitably prior to pyrolysis the screening waste may be dried, for example drying of the screening waste to >70% TS in a forced air dryer.

Pyrolysis is the thermochemical decomposition of organic materials at elevated temperatures in the absence of oxygen, or in low levels or reduced levels of oxygen. Suitably, the λ (lambda) ratio (defined as the dimension-less ratio of the actual mass-based air-fuel ratio to the stoichiometric mass-based air-fuel ratio for complete oxidation (Kg of Air per Kg of fuel)) should be at or below 1 in respect to the pyrolysis gas and below 0.2 in respect to the screening waste feedstock.

Suitably, the pyrolysis may be performed at atmospheric pressure. Suitably pyrolysis may be slow pyrolysis. Suitably, slow pyrolysis may be carried out in a pyrolysis kiln working with screws for continuous material transport and heating the feedstock for example to 700° C. for 20 min.

Alternatively, the particulate carbon adsorbent pyrolysis product may be formed by the form of pyrolysis termed 'gasification'. Gasification aims to maximise the yield of syngas (i.e. CO and $H_2$) by using a higher λ ratio (0.2-0.4 in respect to the screening waste) compared to the pyrolysis process more generally used to make solid products. Because of higher degree of breakdown, the carbon adsorbent from gasification will have a lower carbon content and higher ash content. The pH is usually higher.

Suitably the pyrolysis product is provided from the organic fraction of wastewater screenings wherein at least 95% of the carbon of the particulate originates from wastewater screenings. As discussed, an advantage of the present invention is that it allows organic wastewater screenings in wastewater treatment processes to be used in the treatment of wastewater, effectively allowing the provision of a substantially closed loop system. This system may be undertaken on a single site (i.e. obtaining waste screenings, production of pyrolysis product and use of same substantially on the same site) or it may be the capture of waste screenings and production and/or use of the particulate products are provided on a different site. Advantageously in either example effectively the process is still utilising waste generated by the process in the process at another stage. As will be appreciated by those in the art, during wastewater treatment work some organic waste may slip through the screening step and be caught in the later wastewater treatment steps. This waste is identical to screening waste, so it can also be used as feedstock.

Thus, another aspect of the present invention is a method of reducing the waste requiring offsite transportation in a wastewater treatment process at a site, comprising the step of forming a particulate carbon adsorbate as defined herein from the organic fraction of wastewater screenings provided by the wastewater treatment, and using the particulate carbon adsorbate in a downstream treatment of the wastewater.

If the screening waste is transported over long distances, for example to a second site for pyrolysis, packing material of the waste may be utilised that can also be used as feedstock to avoid any waste formation, for example large paper bags or cardboard boxes. Further, neither a wastewater treatment work nor the site where the screening waste is turned into carbon products is a clean site, so a broad range of potential contaminants may enter the process. This includes insects and rodent. As will be appreciated, this may mean a proportion of the carbon does not originate from the wastewater screenings, for example 5% may be from packaging or contaminant sources such that at least 95% of the carbon of the particulate originates from wastewater screenings.

Suitably the adsorbent may be made from organic screenings that on dry matter basis contain at least 70% volatile solids. Suitably a wastewater screenings feedstock to produce the adsorbent may contain more than 80% volatile solids in its dry mass. Suitably a screenings feedstock may wholly or substantially comprise or consist of two or more of the groups comprising; rags, paper, toilet paper fibres and sanitary products made from natural and plastic materials. The feedstock can consist of materials of natural origin like cellulose fibres or synthetic origin like plastics or a mixture of both.

In contrast to the adsorbent production process taught by Benstoem et al. (2018) based on hydrothermal carbonisation, the use of pyrolysis or gasification of the organic fraction of waste screenings in the present method advantageously allows a whole mixture of various materials (not just toilet paper fibres) to be used as organic screenings. Suitably, no further activation step is required as pyrolysis or gasification provide a porous-rich structure. Unlike pyrolysis, hydrothermal carbonisation eliminates the fibrous structure of feedstock and changes it into spherical particles, as shown for cellulose fibres by Guiotoku et al. (2009).

The present invention provides a synergistic effect that derives from screening waste as a mixture of different materials in contrast to using a single. This yields a carbon adsorbent that, compared to a single feedstock-derived carbon, is advantaged in that it has a broader adsorption spectrum to remove odours from wastewater due to heterogenic surface functionalities, and it is effective over a longer time span due to a heterogenic pore structure with different adsorption kinetics Suitably the particulate carbon adsorbent may include a magnetic species. The magnetic species may be ferrites. The magnetic species may allow the particulate carbon adsorbent used in the wastewater treatment process to be separated after the process to allow the particulate carbon adsorbent to reactivated and reused for further odour prevention or the like. Suitably, magnetic species or precursors to magnetic species may be added to the organic wastewater screenings, alternatively the organic wastewater screenings may be selected from a source which comprises magnetic species precursors. Suitably the organic wastewater screenings may comprise Fe at about 10 g/kg by dry weight, resulting in a particulate carbon adsorbent of the present invention with an Fe content of about 50 g/kg. Suitably, to ensure that sufficient amounts of the Fe species in either an Fe doped organic wastewater screenings or organic wastewater screenings which comprise ferrite precursors is converted to ferromagnetic alpha iron (ferrite), the pyrolysis may be performed at or above 800° C. (e.g. 800-900° C.).

The particulate carbon adsorbents as defined herein is particularly effective for adsorption of odour causing substances in a wastewater treatment plant.

According to another aspect of the invention there is provided a method of odour prevention in wastewater treatment comprising the step of adding a particulate carbon adsorbent as defined herein to the wastewater to be treated.

Suitably the carbon adsorbent product may be provided as a particulate milled to a particle size between 20-125 μm prior to its application to the wastewater. Suitably a dosage of 0.25 wt. % of particulate carbon adsorbent in the wastewater may reduce the odour emissions measured by a total volatile organic compounds (tVOC) sensor by about 90% after 25 minutes of treatment.

In an embodiment the method of using the carbon adsorbent may be part of a treatment process, for example including a screening step (first step of the wastewater treatment) where large wastes are separated from the inflow stream. The process can have one or more screening steps i.e. first a coarse screen (e.g. 6 mm) then a fine screen (e.g. 2 mm).

Suitably a sand trap may also be employed in the treatment process, for example in some WWT, a sand trap follows the screening step to separate fast settling heavy particles (mostly sand). The hydraulic retention time is usually kept below 5 minutes.

Suitably, there may be a primary clarifying step following the screening step and an eventual sand trap in settling tanks to remove slow-settling mineral and organic solid particles from the wastewater. In embodiments, the hydraulic retention time can be 30-90 min. The separated particles form the primary sludge which requires further treatment as described in the below.

Activated sludge treatment—Most WWTs will have an activated sludge treatment for microbial removal of dissolved and fine particulate organic and mineral pollutants. The hydraulic retention time is usually around 2 hours.

The process may then include a secondary clarifying step—after the activated sludge treatment the now treated water is left settling to remove microbial biomass. It is usually the last step before the water is discharged into the environment. The hydraulic retention time is usually 1-2 hours. The separated particles form the secondary (or activated) sludge which is in part returned to the activated sludge process. Excessive amounts of sludge require further treatment as described below.

Sludge treatment—Sludge from the primary and secondary clarifying steps may be treated by different methods incl. eventually anaerobic digestion (to reduce the sludge volume and to yield biogas as renewable fuel), dewatering (e.g. gravimetrically by sedimentation, mechanically by a centrifuge or filter press after flocculation with polymers or metals, thermally e.g. with a belt dryer), eventual pelleting, eventual combustion (as alternative to land spreading or land filling).

Thus, the present invention provides a method of reducing the waste requiring offsite transportation in a wastewater treatment process at a site as described herein, wherein the downstream treatment of the wastewater is one or more of: odour prevention, sludge treatment, adsorption of wastewater bulk pollutants.

The addition of the particulate carbon adsorbent of the invention (formed as discussed above by pyrolysing the organic screening waste fraction and crushing the raw carbon product into a fibrous material or on further crushing or milling a carbon dust of a size between 20-125 μm) and subsequent adsorption of odour causing substances can be carried out after a screening step, in a sand trap or primary settling tank (or tanks) of a wastewater treatment plant (primary clarifying step). In some embodiments, an optimal dosage periodic adsorption test is performed to determine a suitable dosage, however it is likely that a dosage of 10-100 g/m$^3$ wastewater will be sufficient. Suitably, the carbon adsorbent may be mixed with the wastewater by mechanical or hydraulic stirring. Formation of odours from WWT vary over time due to weather and season, and odours may only need to be eliminated if the wind carries them into a certain direction. Suitably, a sensor-based control of odours at the WWT site may be used to reduce the required use of the carbon adsorbent. Suitably, there may be no need to add carbon adsorbent for several days or weeks after a dosage. Suitably, the primary setting tank may have a hydraulic retention time of 30-90 min for separating particulate suspended substances from the wastewater. The particulate carbon adsorbent may adsorb at least some of the odour causing substances like ammonia, hydrogen sulphide, and volatile organic sulphur compounds. The particulate carbon adsorbent may be separated from the wastewater as it is discharged from the settling tank as part of the sludge that settles at the bottom of the tank. Subsequently this primary sludge will be further treated at least by dewatering and eventually anaerobic digestion. The dewatered sludge will either get incinerated, provided to landfill or applied to soil as organic fertiliser. The carbon adsorbent will be beneficial for both incineration and soil use options. It increases the energy value of the sewage sludge due to its high carbon and hydrogen contents and low oxygen content (See Table 3) and it increases the fertiliser value by adding further nutrient and by binding plant nutrients and preventing their leaching into the ground water. Moreover, the carbon adsorbent is highly recalcitrant, thus it can be used as a soil amender to stabilise the soil matrix to avoid erosion and to sequester carbon in the soil.

In embodiments where the carbon adsorbent has a magnetic feature, it can be recovered from the wastewater treatment process, reactivated and used again. Suitably, recovery may be performed from the primary sludge by means of sequential or continuous magnetic separation. Reactivation can be done by heat treatment. Suitably, it may be mixed with the Fe-rich screening waste and the mixture can be treated the same way as shown in FIG. 5 Case D.

In some embodiments, the carbon adsorbent may be added to the wastewater treatment process with the purpose to reduce odours from sludge dewatering and drying. Before the sludge is dewatered (e.g. by a centrifuge or filter press) the carbon adsorbent is mixed with the sludge and left reacting for at least 20 min. The optimal dosage should again be determined by adsorption tests in the lab.

Adsorption of odour causing substances may be carried out in mechanical or thermal dewatering of sewage sludge. The particulate carbon adsorbent may adsorb at least some of the odour causing substances like ammonia, hydrogen sulphide, and volatile organic sulphur compounds.

In embodiments of the method, the particulate carbon adsorbent may be added into a wastewater or sludge supply of a settling tank or dewatering unit. The particulate carbon adsorbent may be added regularly with a batching process of settling or dewatering. The particulate carbon adsorbent may be added continuously in a continuous process of settling or dewatering. The adsorbent may also be added only at times of elevated odour emissions as measured by sensors, noticed by humans or a combination thereof.

The particulate carbon adsorbent may be actively mixed into an inflow stream of the wastewater by mechanical or hydraulic mixing to ensure that the particulate carbon adsorbent is able to efficiently adsorb odour causing substances and therefore enhance the effectiveness of odour prevention.

Suitably the surface of the particulate carbon adsorbent as discussed herein provides sufficient porosity to provide a high surface area for physical or chemical type adsorption of odour causing substances.

In embodiments, the concentration of the particulate carbon adsorbent to the inflow stream can be about 10-1000 g per m$^3$ of wastewater. Typically, the concentration of the particulate carbon adsorbent added to the wastewater will be dependent on the concentration of odour causing substances and the required level of odour prevention.

The invention extends in another aspect to a method of manufacture of particulate carbon adsorbents as defined herein, the method comprising the steps:
(a) providing an organic waste screening material from water treatment with a dry matter content of at least 50%,
(b) pyrolysing the material of step (a) at a temperature from 400° C. to 900° C.; and
(c) grinding and/or crushing the pyrolysed material of step (b).
Optionally, the method further comprises the step of:
(d) sorting the ground pyrolysed material resulting from step (c).

A wastewater treatment plant can have a cascade of screens where more than one screen produces suitable organic screenings. The adsorbent can be produced from one source or from a mixture of several sources. However, if the screening process includes a specific process to remove mineral solids like grit, sand, gravel, cinder then advantageously these mineral solids are not used in the present process.

If in the collection of the screenings, the organic waste screening material is provided with a dry matter content below 50%, the method further comprises a drying step to increase the dry matter content to at least 50%, suitably, to a dry matter content of at least 70%. Methods of drying are well known in the art.

Suitably, drying may be conducted using a two-stage process, e.g. mechanic separation e.g. by a screw process to a dry matter content to around 30%, followed by thermal drying to at least 50% but preferably above 70%. Suitably, additives or the precursors to additives may be added to the substantially organic waste screening material prior to the pyrolysis step (step b), which following pyrolysis result in the composition described in Tables 3 and 4. Suitably, the additives may be added in solution. A uniform distribution may be ensured through the simultaneous fine-spraying of the additives and mixing of the screening waste e.g. in drum-type mixer.

Suitably, Mg may be added to the organic waste screening material in solution (e.g. a solution of $MgCl_2$). The organic waste screening material may then be dried to a dry matter content of at least 50 wt. % and preferably >70 wt. % (Total solids) in a forced air dryer. In pyrolysis, hydrated $MgCl_2$ decomposes into MgO.

Suitably the screenings material may be compressed before the step of pyrolysing. Compression may be beneficial where the screening and the pyrolysis occurs at different locations. Suitably shredded organic material may be compressed into a block. For example, the shredded substantially organic material may be compressed into a block of about 3 cm (typically maximum size for direct feeding into pyrolysis reactor), 4 cm or 5 cm in diameter or cross section. The block may be a compressed briquette or pellet form of the shredded organic material.

In some embodiments the organic screening material may be shredded before it is pyrolysed, to allow a uniform carbonisation.

In the present invention, the fibrous portion of the organic fraction of waste screenings is maintained throughout the pyrolysis, to yield a product that is substantially fibrous.

Compared with a method where the fibres are isolated and then pyrolysed, by pyrolysing the organic fraction of waste screenings then isolating the fibres, the present invention has the following advantages:

Mass reduction—During pyrolysis about 80% of the feedstock dry mass is removed. The present invention therefore grinds or crushes much less material.

Removal of matter which impedes grinding or crushing—pyrolysis decomposes waste plastics which would interfere with milling the feedstock, simplifying the manufacturing process.

Higher throughput—isolated fibres have a lower bulk density leading to lower throughput in the pyrolysis plant Carbonised fibres are more friable than their feedstock precursor, which will save energy in the milling step.

In some embodiments, step (b) can be performed in a pyrolysis kiln. In a preferred embodiment, the pyrolysis kiln can be a slow pyrolysis kiln configured to produce carbon products such as biochar or charcoal. Such kilns are known to those of skill in the art. Suitably, pyrolysis may be performed in batch or continuous process. Due to a higher throughput and energy efficiency, plus better process control, a continuous process is preferred. Suitably, a continuous process can be carried out in a pyrolysis kiln working with either a rotary kiln or screws for internal material transport.

Suitably the organic screening material may be pyrolysed at a temperature from 400° C. to 900° C. Suitably, the material is pyrolysed at a temperature from 600° C. to 900° C. Suitably, the material is pyrolysed at a temperature of about 650-750° C. Suitably, the material is pyrolysed at a temperature of about 700° C. Temperatures outside this range will lead to a product that is less rich in micropores.

In embodiments where the screening waste feedstock contains or is likely to contain aluminium waste in mm or cm sizes (case C in FIG. 5), it is preferable to use a two-stage pyrolysis protocol. Aluminium e.g. as a foil and particularly as a composite with plastic or paper is difficult to remove from the screening waste feedstock. It is much easier to remove it from a pyrolysed waste mixture, however, aluminium melts at ~660° C. Therefore, in such embodiments the 2-stage pyrolysis process can comprise a first stage pyrolysis at about 400-500° C. This is followed by the use of established techniques to removal of ferrous and non-ferrous metals, before the cleaned product is subjected to a second pyrolysis process at the designated final temperature. Afterwards no further metal separation is needed.

In embodiments where a magnetic particulate carbon adsorbent is desired, (Case D in FIG. 5) screening waste feedstock advantageously contains at least 10 g/kg (dry basis) magnetic precursor material (either already present in the material, or subsequently doped to that concentration). In such embodiments, pyrolysis should be carried out at a temperature of 800-900° C. to allow structural changes in the Fe that lead to a higher portion of ferromagnetic alpha iron (ferrite). In such embodiments, magnetic waste separation should be carried out prior to the pyrolysis process.

In some embodiments, a small amount air or oxygen can be added into the reaction chamber with the purpose to incinerate the pyrolysis gases that are inevitably released in any pyrolysis process. This will generate heat to fuel to process. As described above, suitably the $\lambda 0$ (lambda) ratio may be $\leq 1$ (in case of the pyrolysis gases deriving from the screening waste are considered as the fuel) or $\leq 0.2$ (in case of the waste screening material is considered as the fuel). As an alternative to using the pyrolysis gases as fuel for supplying the process heat, the process heat can also be provided by electrical heating or microwave heating.

Suitably, the organic screening material may be pyrolysed for at least 20 minutes. This process is often termed slow pyrolysis. Generally, a longer time will drive more volatiles from the feedstock thus making the product more porous and more aromatic. However, temperature can be increased instead of the retention time to also achieve this effect.

Longer times however may be required in case of using larger feedstock particles because of the slower heat transfer. 20 min should work for particles below a diameter of 1 cm (or sheet strength). For 1-3 cm size I would go up to 30-60 min. For shredded screening waste 20 min should be fine. If pressed into large blocks and not shredded the holding time may need to go up.

Suitably, the raw carbon adsorbent may be cooled below 30° C. before further processing. It is recommended to add a mass dosage of 30% water to the adsorbent by spraying to accelerate the cooling process, reduce dusting and to mitigate the risk of a carbon dust explosion or spontaneous incineration.

It is likely that the raw carbon adsorbent will contain mineral contaminants in mm or cm size such as metals, glass and grit. Suitably, ferrous metals may be removed by standard magnetic separation. The carbon adsorbent has a particle density of around 2 $g/cm^3$. Suitably, heavier materials such as glass and grit may be separated based on density e.g. by air separation. Suitably, the separation of ferrous metals, glass and/or grit may be performed before the grinding/crushing step, as these materials can damage the mill.

Following pyrolysis, the carbon adsorbent is milled or crushed to break down the raw carbonized tissues into isolated carbon fibres. Suitably, this may be performed by conventional mills like a hammer mill or cone mill.

Suitably the step of sorting the ground pyrolysed material may be carried out by sieving or sifting the material to isolate particulates that fall within a chosen particle range. To ensure a high yield of carbon fibres, an aperture between about 20 μm and about 500 μm may be particularly suitable. An aperture of 20 μm was found to mainly yield amorphous dust particles with only a few short fibres visible (as shown in FIG. 4). In addition, sorting may also comprise a separate process for metal separation.

In embodiments, the micropores of the present invention may be formed by use of pyrolysis at the range of about 600-900° C. In a preferred embodiment, the temperature used in pyrolysis is about 700° C.

According to another aspect of the invention there is provided a method for adsorption of wastewater bulk pollutants comprising the step of adding a particulate carbon adsorbent as defined herein to the wastewater to be treated.

Suitably, in the method, the particulate carbon adsorbent is added to wastewater to capture bulk mineral and organic bulk pollutants. Suitably the adsorbent is provided to the wastewater as a point in the process suitable to adsorb at least one of phosphate, ammonium, and organic pollutants measured as chemical oxygen demand (COD) from an aqueous solution.

After use, the particulate carbon adsorbent may be recovered from the wastewater once the pollutants within the wastewater have been captured by the particulate carbon adsorbent.

For example, the wastewater may be filtered. In another example, chemical or biological processes can lead to flotation of the carbon particulate, for example acidic wastewater can cause the calcium carbonate in the carbon product to disintegrate forming $CO_2$ bubbles that adhere to the carbon product and make it float, or alternatively microbes can settle on the carbon product forming gas microbubbles of $CO_2$, $CH_4$, $N_2$, $NH_3$ and other gases. The particulate carbon adsorbent may then be skimmed from the surface of the wastewater. Further, the particulate carbon adsorbent may settle and then be removed from the wastewater. Settling can occur naturally or enforced by using a centrifuge. Further, the adsorbent may have a magnetic feature enabling magnetic separation from the wastewater treatment process.

After use, the recovered particulate carbon adsorbent is typically enriched with phosphorous, ammonium and other plant nutrients. The enriched particulate carbon adsorbent may be used to provide soil with an additional source of nutrients. Accordingly, the enriched particulate carbon adsorbent may be used as a fertiliser, or added to enrich a fertiliser. Further, the enriched particulate carbon adsorbent can also be used as additive in anaerobic digestion plants. For example, the particulate carbon adsorbent can be added to the aerobic treatment step of a wastewater treatment plant to adsorb phosphate. The enriched particulate carbon adsorbent can then be transferred into an anaerobic digester together with the sewage sludge that is produced in the same wastewater treatment plant.

According to another aspect of the invention, there is provided an anaerobic digestion process comprising the steps:
(a) adding a feedstock to a bioreactor;
(b) adding a microorganism composition to the bioreactor;
(c) adding a carbon adsorbent as defined herein of the invention wherein the adsorbent comprises adsorbed phosphate, ammonium or other nutrients for the microorganism;
(d) incubating the microorganisms within the bioreactor to produce a digestate and biogas; and
(e) removing the produced biogas and digestate.

The use of screenings-derived carbon adsorbent in a bioreactor as described can increase the biogas yield of anaerobic digestion sewage sludge. Suitably particulate adsorbent may be added to the bioreactor in powdered form with a particle size of below 20 µm and at dosage in the range 0.01 wt % to 0.1 wt %, for example 0.1 wt. % for particles below 20 µm and 0.01 wt % for very fine particles below 5 µm.

Without wishing to be bound by theory, it is considered that the fibres of the carbon particulates don't provide an attractive settling ground for the microbes compared to planar carbon or carbon flakes for example as described in WO2018/104730. However, as the fibres of the carbon particulates are used in the WWT process it is considered chemical or microbial "weathering" may make the surface more "rough" and more attractive for microbial colonisation because of the mineral and organic nutrients that they have adsorbed for the aerobic digestion microbes to take up.

As discussed, during the production process of fibres of the carbon particulates, fine non-fibrous particles can be provided. These fine non-fibrous particles (fine dust <20 µm) may be particularly advantageous for use in anaerobic digestion. These may be particularly effective at nano size.

Suitably, the feedstock added to a bioreactor may comprise organic waste, such as waste from sewage plants, food and beverage waste, processing residues such as bakery and brewery waste, agricultural residues such as manure, straw, leaves, or unwanted fruit and vegetables, and specifically grown crops such as maize, grass silage, energy beet and whole-crop cereals.

Suitably the microorganism composition may comprise bacteria that hydrolyse the feedstock. Suitably a microorganism composition may comprise acidogenic bacteria that convert sugars and amino acids into carbon dioxide, hydrogen, ammonia and organic acids. Bacteria within the microorganism composition may convert organic acids into acetic acid, formic acid, hydrogen and carbon dioxide. The microorganism composition may comprise methanogenic archaea that are able to convert the products of feedstock hydrolysis into methane and carbon dioxide. Typically, the microorganism composition may comprise a combination of types of bacteria and archaea such that the microorganism composition is capable of converting the feedstock added to the bioreactor into biogas and digestate.

Carbon dioxide and methane produced by the microorganism composition forms the biogas that is typically the desired product of the bioreactor. Alternatively, they form a hydrogen-rich gas as the desired product.

Without wishing to be bound by theory, it is considered the particulate carbon adsorbent adsorbs soluble compounds of the feedstock and by-products of the anaerobic digestion process. It is considered the particulate carbon adsorbent adsorbs soluble compounds of the feedstock and by-products of the anaerobic digestion process that inhibit the anaerobic digestion process either already at the beginning or during the production process. The inhibitory compounds of the feedstock or by-products of anaerobic digestion may include organic acids, including C1-C10 organic acids, ammonia, and hydrogen sulphide. Further, free ammonia ($NH_3$) and hydrogen sulphide ($H_2S$) in addition to their inhibitory potential also decrease the biogas quality, thus they need to be removed before the biogas can be used as fuel. Binding them on the particulate carbon adsorbent will reduce their concentration in the biogas and thus reduce the need for external biogas cleaning. Further, carbon adsorbent that is produced at temperatures of above 600° C. to expected to be electrically conductive and, thus, in fine powered form it can provide the microbial consortium with means for direct interspecies electron transfer (DIET). DIET is seen advantageous over chemically conveyed electron transfer e.g. by hydrogen as its less prone to disturbances. The model is that the conductive fine particles become incorporated in existing microbial agglomerates (i.e. flocs or granules) making them electrically conductive.

Preferred features and embodiments of each aspect of the invention are as for each of the other aspects mutatis mutandis unless context demands otherwise.

Throughout the specification, unless the context demands otherwise, the terms 'comprise' or 'include', or variations such as 'comprises' or 'comprising', 'includes' or 'including' will be understood to imply the includes of a stated integer or group of integers, but not the exclusion of any other integer or group of integers.

BRIEF DESCRIPTION OF THE FIGURES

Embodiments of the present invention will now be described, by way of non-limiting examples, with reference to the accompanying drawings in which.

DETAILED DESCRIPTION EXAMPLES

Figure 1:
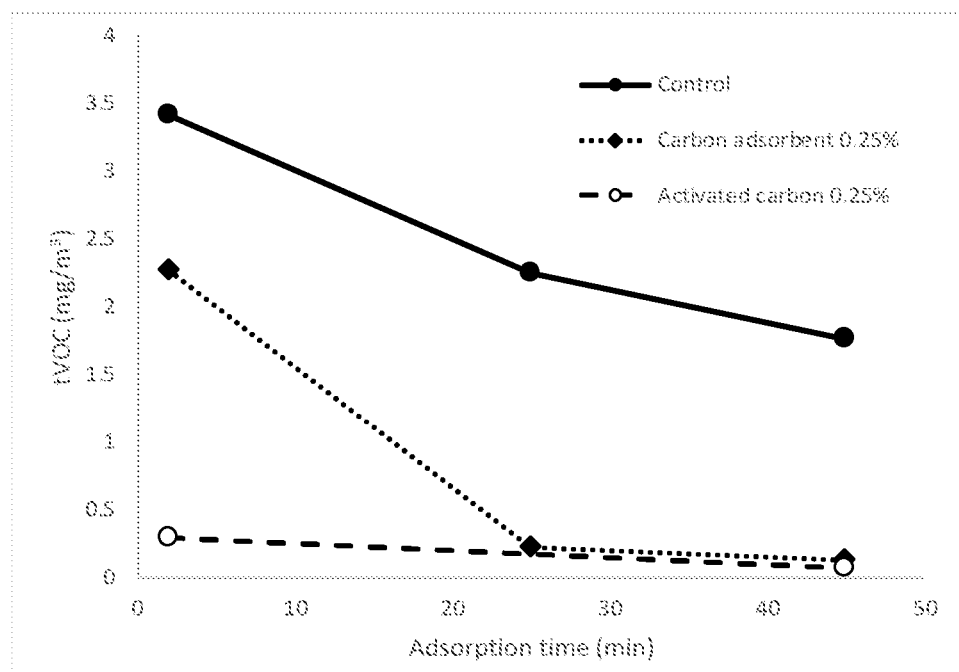
FIG. 1: Impact of screenings-derived carbon adsorbent on the reduction of the total volatile organic compounds (tVOC) released from wastewater compared to untreated and activated carbon as reference. Measured after adsorption times of 2 min, 25 min and 45 min.

Both crude wastewater and the organic fraction of wastewater screening waste were obtained from Scottish Water's Seafield Wastewater Treatment Works in Edinburgh, UK. The screening matter was pre-dried by means of a screw press. The wastewater was analysed with a pH of 7.3, electrical conductivity of 1260 mS/cm, COD content of 313 mg/L, total phosphor content of 6.05 mg/L, and ammonia nitrogen content of 37.18 mg/L. Sulphide was below the detection limit of the used technique of 0.1 mg/L $S^{2-}$.

Example 1—Small-Scale Production of the Particulate Carbon Adsorbent

The screening waste was turned into the fibrous carbon adsorbent of the first aspect of the present invention by following steps:

1. Drying. 1473 g of raw screening waste was dried at 105° C. for 12 h. It was found that the raw screening waste had a water content of about 70%.
2. Pyrolysis. 402 g of the dried screening waste was filled into a 2 litre metal crucible. The crucible was filled to the top to leave as little air as possible and, thus, the process can be considered to be conducted in the absence of air (0.005 g air per g of feedstock. The represents a lambda value of $5.4 \times 10^{-4}$). A lid was put on the crucible and it was then placed in a muffle furnace where it was heated to 700° C. for 4 h. Afterwards the crucible was left cooling to 50° C. before it was opened, and the produced raw carbon adsorbent was removed. The dry-mass based yield of raw carbon adsorbent was about 19%.
3. Gentle crushing. To isolate the carbon fibres the raw carbon adsorbent was crushed by putting it into a plastic bag and squeezing the filled bag until the particle size was visibly reduced.
4. Sieving. The crushed carbon adsorbent was sieved manually through flat round sieves with designated apertures sizes. Carbon adsorbent material that was too large to pass through a 500 μm size was returned to Step #3.

The properties of the final carbon adsorbent were as described above in Tables 1, 2, 3 and 4.

TABLE 5 illustrates an example of the chemical composition of the carbon adsorbent made from organic wastewater screenings

| Element | Concentration (mg/kg) | Element | Concentration (mg/kg) |
|---|---|---|---|
| C | 750000 | Mn | 161 |
| N | 17900 | Ni | 4 |
| H | 16300 | Pb | 7 |
| Al | 1922 | Zn | 265 |
| Ca | 33279 | As | 1 |
| Fe | 2076 | Mo | 2 |
| K | 3558 | Cd | <1 |
| Mg | 4898 | Cr | <1 |
| P | 8155 | Hg | <1 |
| Cu | 80 | Cs | <1 |

Example 2: Small-Scale Particulate Carbon Odour Removal Test

Commercial activated carbon C3345 Fluka was used as reference material (particle size: 100-400 mesh, surface area: 1400 $m^2/g$). It was obtained from Sigma Aldrich.

The adsorption trials to investigate the efficiency of the carbon adsorbent of the present invention in odour removal were conducted in 50 mL falcon tubes using following steps 1. 50 mg of carbon adsorbent that passed a 125 μm sieve but not a 20 μm sieve was weighted into the falcon tubes. As reference another falcon tube with filled with 50 mg of the activated carbon. As Control another falcon tube was left without any adsorbent.
2. 20 mL of crude wastewater was added into each falcon tube resulting in a mass-based ratio of adsorbent to water of 0.25%
3. The falcon tubes were closed with lids and the contents of the falcon tubes were mixed by a laboratory vortex mixer for 20 s.
4. The falcon tubes were left alone for adsorption times of either 2 min, 25 min, and 45 min.
5. Odour emission measurement was done in a controlled air flow chamber. This chamber was made of plastic with a transparent lid, had a volume of 5 L and was equipped with a pump to establish a continuous air flow through the chamber at a rate of 5 L per minute representing an air exchange rate of one per minute. The chamber was operated inside a fume cupboard to ensure safe removal of all emissions. An Ingeress Air quality Monitor Detector was placed inside the chamber. The detector is equipped with a sensor for measuring the total natural and synthetic volatile organic compounds causing most odours (tVOC). To measure the odour emission, the lid of the falcon tube was opened and the tube was immediately placed inside the chamber. Reading of the tVOC measurement value was done after 4 min when the air inside the chamber was exchanged 4 times assuming a steady release of odour causing substances has been established.

6. Between individual measurements the measurement chamber was flushed with ambient air from the lab until the tVOC value reached a stable background level.

Results

The tVOC measurement value of the Control (no adsorbent added) declined from 3.4 mg/m$^3$ after 2 min of the experimental start point (when the adsorbent was added to the other experiments) to 2.2 mg/m$^3$ after 25 min and to 1.7 mg/m$^3$ after 45 min. This decline can be explained by an aeration effect due to intensive mixing, increasing the concentration of dissolved oxygen in the wastewater. Mixing was performed also for the Control despite the fact that no adsorbent was added. As described above, oxygen is known to eliminate odours from wastewater.

Compared to the Control, the fibrous carbon adsorbent removed 34% of the tVOC after 2 min, 90% after 25 min, and 93% after 45 min. These values include the signal of the background tVOC in the ambient air. After 45 min, the tVOC concentration of 0.12 mg/m$^3$ levelled with the background value of 0.13 mg/m$^3$, thus no further tVOC removal could be detected. Activated carbon was found to react quicker already removing 91% of the tVOC after 2 min adsorption. After 45 min, activated carbon treatment also reached the background level of tVOC.

A dosage of 2.5 g of carbon adsorbent per L of wastewater was considered suitably to remove the tVOC emissions to below the detection limit. This result was confirmed by olfactory means where odour was significantly reduced. Compared to activated carbon the adsorbent requires a longer reaction time, however they both reach the same end point. However, primary settling tanks usually have a sufficient retention time of 30-60 min.

Thus, optionally, the method is able to decrease the emission of total volatile organic carbon compounds (tVOC) from the wastewater by more than 85% after 25 minutes of treatment.

Example 3—Large Scale Production of the Particulate Carbon Adsorbent

Figure 5C:
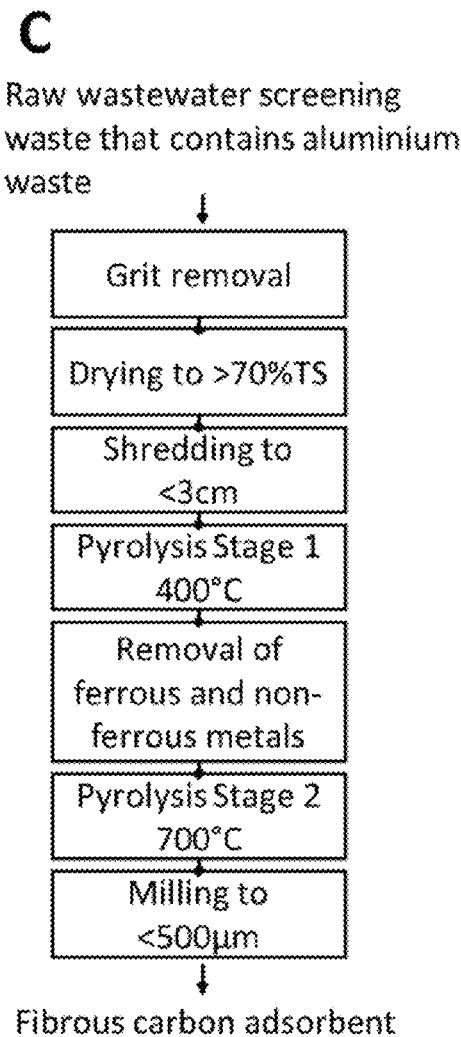
FIG. 5: Examples of the manufacturing process incl. standard process (A), production of a MgO-enriched carbon adsorbent (B), use of screening waste that is contaminated with aluminium waste (C), production of a magnetic carbon adsorbent (D).
Figure 5D:
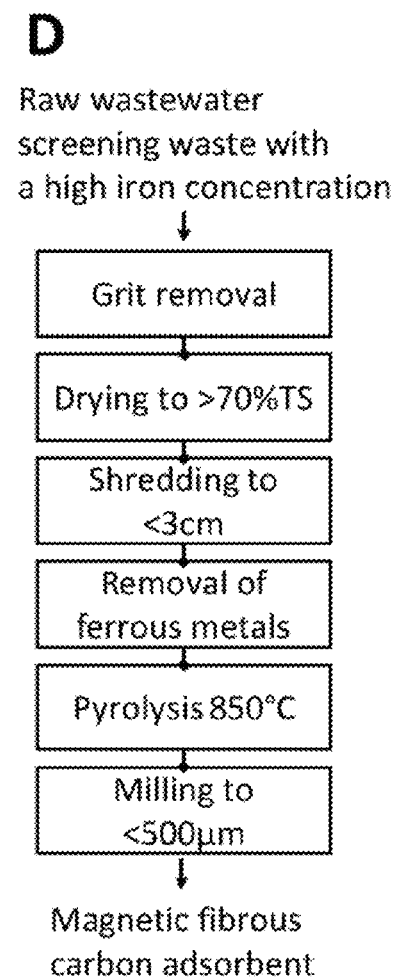

Examples of the manufacturing process are shown in FIG. 5.

Following the standard process (A), crude wastewater undertook raw screening: Grit removal, drying, shredding, pyrolysis, removal of ferrous metals, and milling.

Grit removal is a well-established standard process in wastewater treatment based on weight-based separation. Drying can be conducted in a batch or continuous process. Preferably a two-stage process is performed: 1$^{st}$ mechanical separation e.g. by a screw process to a dry matter content to around 30%, 2$^{nd}$ thermal drying to at least 50% but preferably above 70%. To allow a uniform carbonisation, a shredding step is recommended before the pyrolysis process. An established particle size for carbonisation is below 3 cm. Pyrolysis can be done in a batch or continuous process. Because of a higher throughput and higher energy efficiency and better process control, a continuous process is preferred. The continuous process can be carried out in a pyrolysis kiln working with either a rotary kiln or screws for material transport. During the process, the screening waste is heated to a process temperature of several hundred degrees Celsius for at least 20 min. This process is often termed slow pyrolysis. The minimum temperature required for full carbonisation and to destroy micro- and macro plastics inside the screening waste is 400° C. However, the preferred temperature range is 600-800° C. and more preferably 650-750° C. A lower or higher temperature will lead a product that is less rich in micropores. During pyrolysis, small amount air or oxygen can be added into the reaction chamber with the purpose to incinerate the pyrolysis gases that are inevitably released in any pyrolysis process. This will generate heat to fuel to process. Suitably the $\lambda$ (lambda) ratio for air dosage may be ≤1 (in case of the pyrolysis gases deriving from the screening waste are considered as the fuel) or ≤0.2 (in case of the waste screening material is considered as the fuel). As an alternative to using the pyrolysis gases as fuel for supplying the process heat, the process heat can also be provided by electrical heating or microwave heating. After pyrolysis, the raw carbon adsorbent is left cooling down to below 30° C. before further processing. Spraying the adsorbent with water to a % wt of 30% water accelerates the cooling down and to reduce dusting and to mitigate the risk of a carbon dust explosion or spontaneous incineration. The carbon adsorbent is milled to break down the raw carbonised tissues into isolated carbon fibres. This can be done by conventional mills like a hammer mill or cone mill.

For a high fibre recovery, the mill should have a screen with an aperture size in the range of 125 µm to 500 µm. Afterwards, the ground carbon adsorbent can be further size screened e.g. to remove dust below 20 µm. Ferrous metals can be removed by standard magnetic separation. As the carbon adsorbent has a solid particle density of around 2 g/cm$^3$ heavy materials like glass and grit can be separated based on density e.g. by air separation.

Example 4—Use of the Fibrous Carbon Adsorbent to Eliminate Odours in Wastewater Treatment Plants Carbon adsorbent can be added at the influent of the wastewater treatment (WWT) plant after the screening step and before the primary sludge settling tanks (primary clarifying/clarifier step), and mixed with the wastewater by hydraulic stirring. Following dosage periodic adsorption tests, 25 g/m$^3$ wastewater can be olfactory deemed to be sufficient in substantially removing odours in the sludge settling tanks. Suitably, local environmental conditions on the testing day in summer in Scotland, can be sunny intervals at 21° C., 72% humidity, with a 6 mph NNW wind.

The carbon adsorbent can be separated from the water stream in the primary clarifier treatment step by settling to the tank bottom along with natural sludge particles. Subsequently this primary sludge can then be treated by dewatering and incineration.

Example 5—Small-Scale Particulate Carbon Adsorption Test: Phosphate (P), Ammonium Nitrogen ($NH_4$—N) and COD Removal An experiment was carried out to determine the carbon adsorbent's efficiency for phosphate (P), ammonium nitrogen ($NH_4$—N) and COD removal. Carbon adsorbent manufactured by the method of Example 1. Wastewater from Scottish Water's Seafield Wastewater Treatment Works in Edinburgh, UK was used. To reduce the impact of suspended matter on the experiment's analytical results, the wastewater was filtered through a 0.22 µm syringe filter as pre-treatment. Filtering reduced the COD content from 313 mg/L to 97 mg/L, the P content from 6.05 mg/L to 4.30 mg/L and $NH_4$—N from 37.18 mg/L to 32.66 mg/L. In contrast to Example 1 all carbon adsorbent particles that passed a sieve of 125 μm were used, so no lower particle size limit was defined.

The adsorption experiment was carried out in following steps
1. 50 mL falcon tubes were filled with the carbon adsorbent in a dosage of 0 mg, 2 mg and 20 mg for designated concentrations of 0 g/L (Control), 0.1 g/L, and 1 g/L.
2. 20 mL of filtered wastewater was filled into the falcon tubes.
3. The falcon tubes with lids on were placed on a laboratory shaker for 60 min at 15° C.
4. The falcon tubes were centrifuged and then filtered through 0.22 μm syringe filters to remove the carbon particles. The same was applied to the Control.
5. Hach Lange cuvette tests were used to determine the liquors' concentration of COD, P and $NH_4$—N.

Figure 2A:
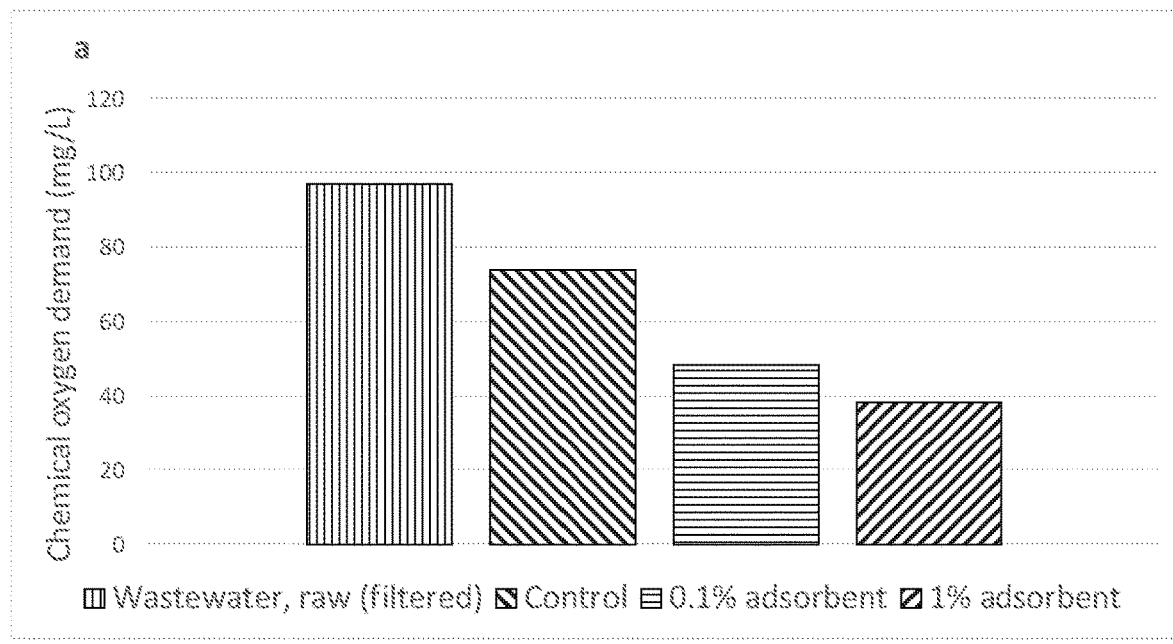
FIG. 2: Impact of screening waste-derived carbon adsorbent (at two different dosages) on the reduction of the chemical oxygen demand (a), phosphorous (b), and ammonium (c).
Figure 2B:
Figure 2C:
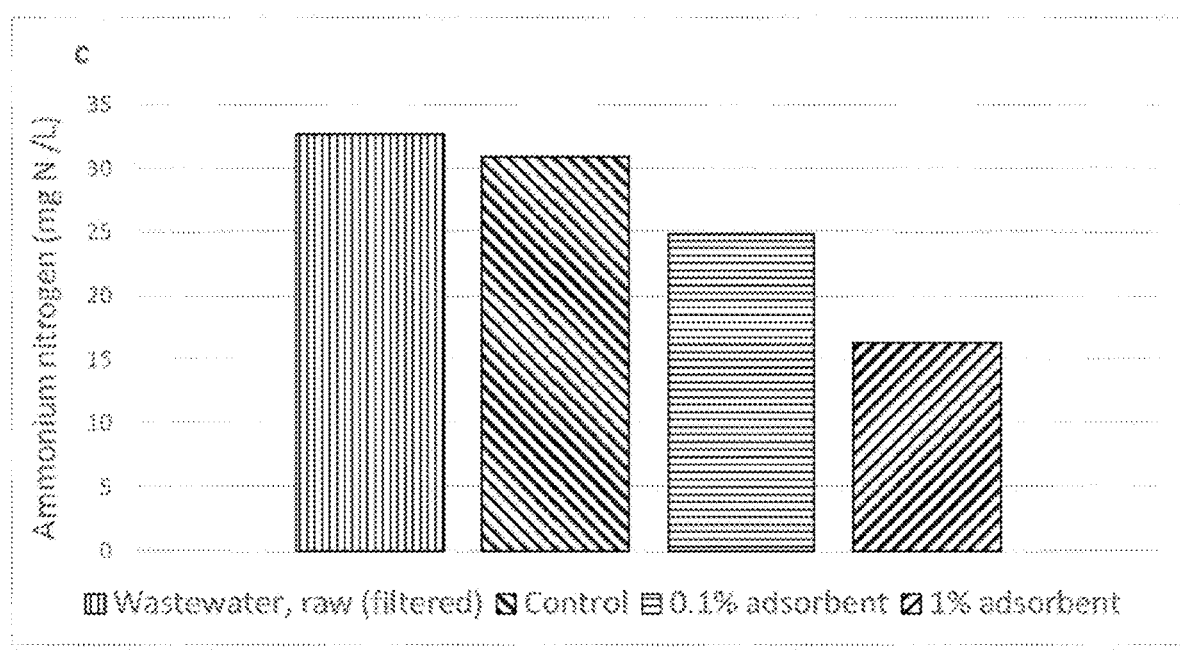
Figure 3:
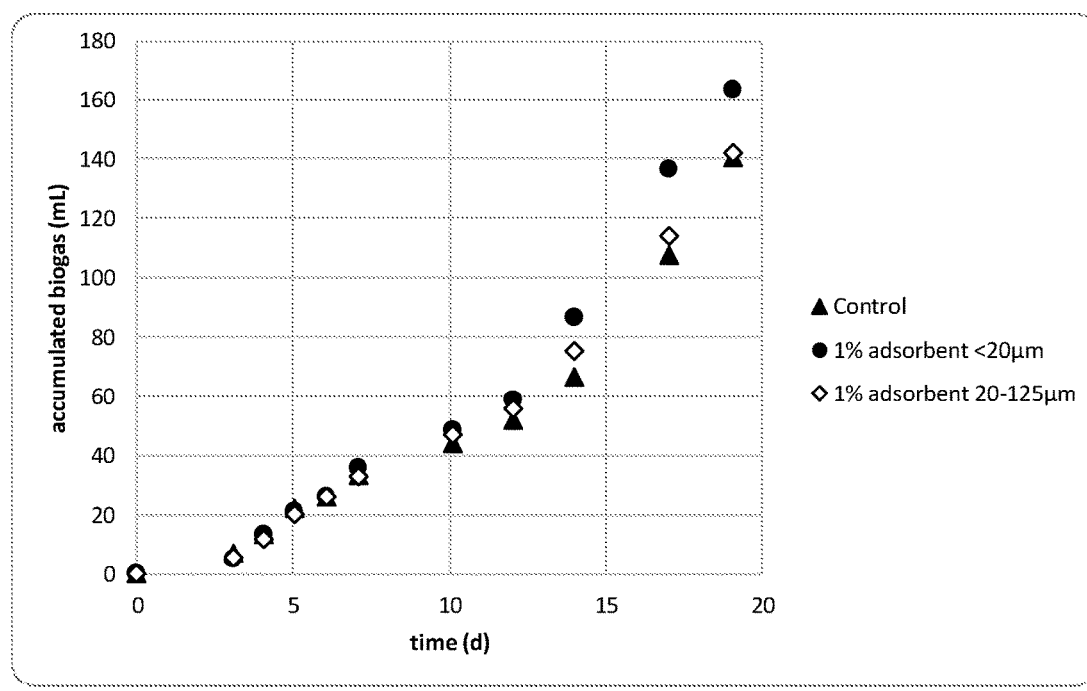
FIG. 3: Impact of screenings derived carbon adsorbent at two different particle sizes on biogas production.
Figure 4A:
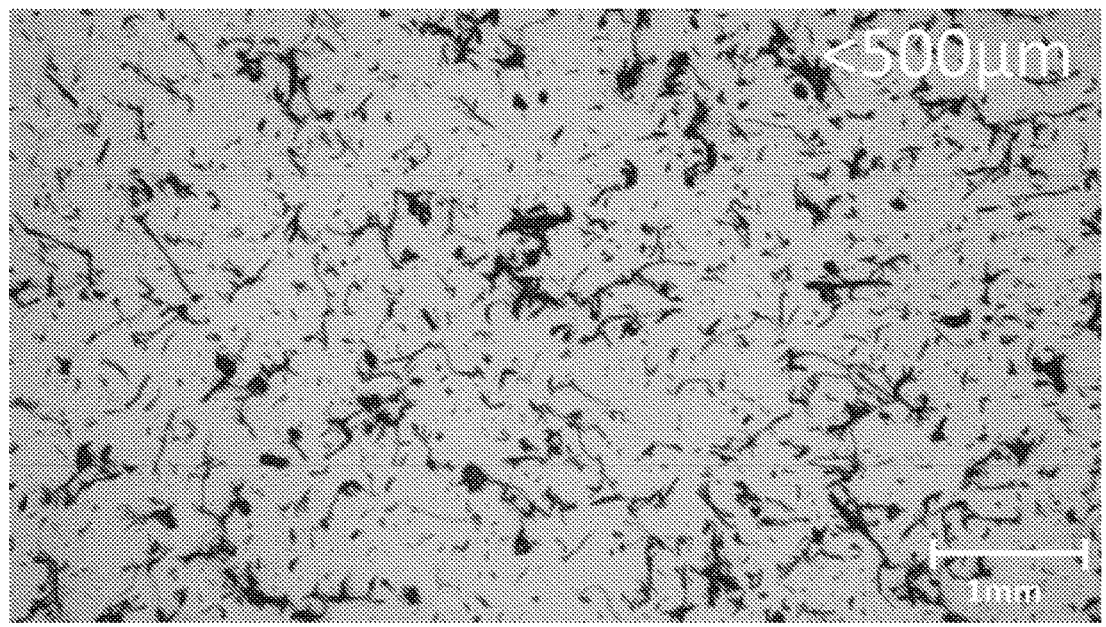
FIG. 4: Microscopy photos of the fibrous carbon adsorbent sieved through a 500 μm sieve (a), a 125 μm sieve (b) and a 20 μm sieve (c).
Figure 4B:
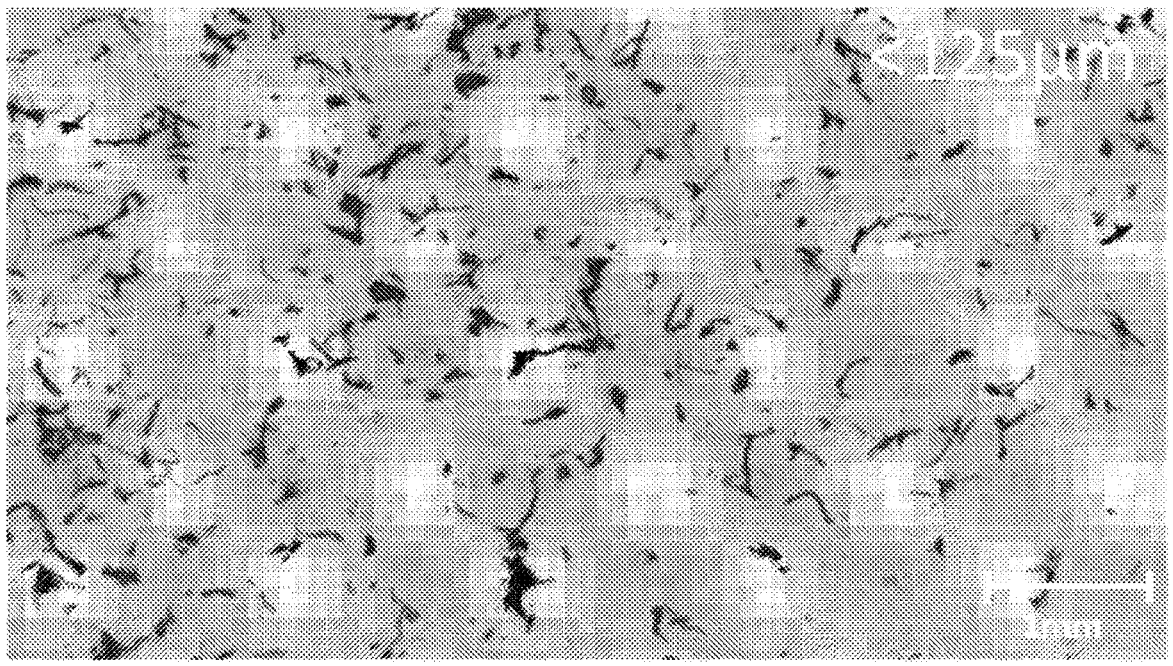
Figure 4C:
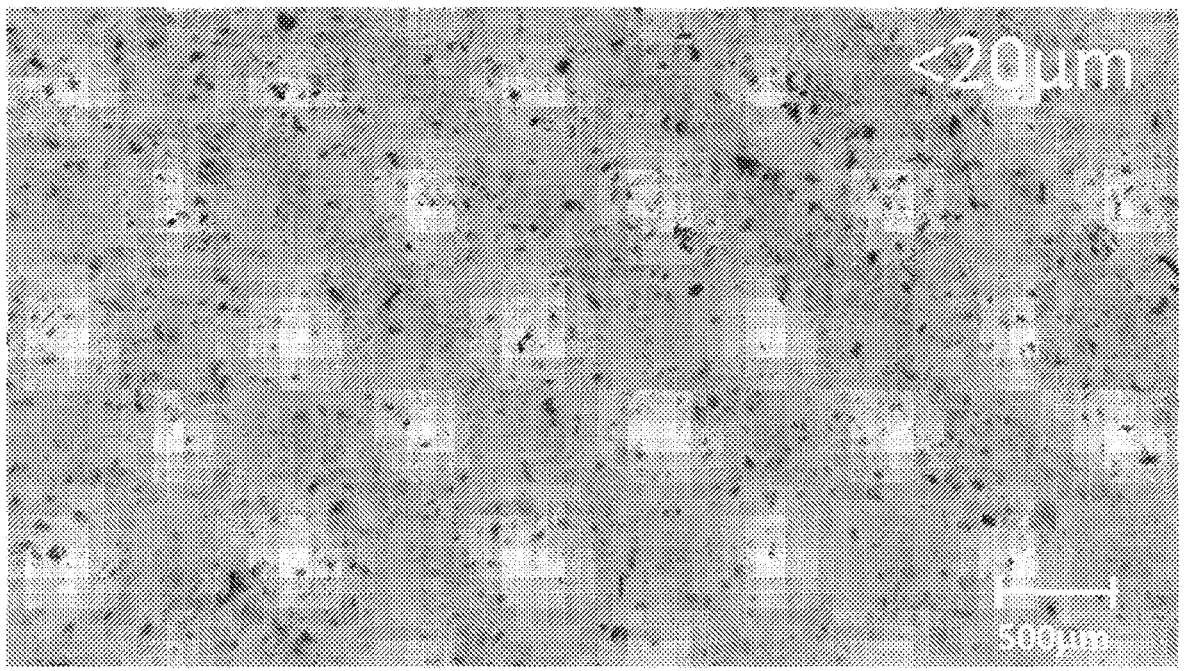

Results (See FIG. 2a-c):

Loss of COD, P, and $NH_4$—N in the Control can be explained by a combined effect of adsorption by the wall of the falcon tubes, gaseous losses, removal by centrifuging and filtering.

Carbon adsorbent in a dosage of 1 g/L was able to remove 48% of COD, 24% of P and 47% of $NH_4$—N compared to the Control.

Example 6—Production of Fibrous Carbon Adsorbent with a Higher P Adsorption Capacity Production of fibrous carbon adsorbent to remove COD, P, and $NH_4$—N may be performed following the same method for odour elimination in wastewater treatment (i.e. the third aspect of the invention).

However, as an embodiment of the present invention, a version of the present invention was prepared with a higher P adsorption capacity. The carbon adsorbent can be enriched with Magnesium to yield a carbon adsorbent with 0.5-5% Mg using the following addition to the method used in Example 2 (FIG. 5, case B):
1. $MgCl_2$ can be added at a dosage of 6 g molar mass of Mg per kg of screening waste to the screening waste as $MgCl_2$ solution prior to drying and subsequent pyrolysis. To ensure a uniform distribution, the $MgCl_2$ solution can be added by simultaneous fine-spraying and mixing the screening waste in drum-type mixer.
2. Afterwards, the screening waste can be dried to at least 50% Total Solids in a forced air dryer. The exhaust air contains HCl gas, so it needs to be treated by water scrubbing before it is released.
3. During the pyrolysis step, hydrated $MgCl_2$ reacts to form MgO, the most effective Mg form for P adsorption.

Example 7—Large-Scale Use of the Fibrous Carbon Adsorbent to Remove COD, P, and Ammonia from Wastewater Suitably, the carbon adsorbent can be added to the WWT process at the same points as for odour removal. These are before primary settling and before sludge dewatering. In addition, carbon adsorbent that has a magnetic feature can be applied at the backend of the WWT plant as a polishing step to remove remaining contaminates before the treated water is discharged. The magnetic feature enables a magnetic separation before the water is discharged.

Example 8—The Effect of Carbon Adsorbent on Anaerobic Digestion: Small Scale Test To test the effect of the carbon adsorbent on anaerobic digestion (AD), digestate and sewage sludge were obtained from Scottish Water's Seafield Wastewater Treatment Works in Edinburgh, UK. The carbon adsorbent was produced as described under Example 1. Two particle size ranges were tested. 20-125 μm and below 20 μm. The AD experiment was carried out in 100 mL glass syringes kept at 38° C.

Steps:
1. Syringes were filled with 20 mL of digestate and carbon adsorbent at a dosage of 1 wt. %. A Control was run without adsorbent.
2. The syringes were placed on a rotating wheel inside a 38° C. incubation room for 19 days.
3. On day 4 and day 10 each syringe was fed with 1 g of sewage sludge.
4. During the experiment the gas volume was measured every 1-3 days by means of the plunger displacement. The methane concentration of the produced gas was measured at 5 times.

Results:

The Control produced about 81 mL of methane

The particle size range of below 20 μm showed an increase of 19% in methane yield, whereas no effect was found for the larger particles. Thus, fine powder formed by the process as described herein may be particularly effective for enhancing anaerobic digestion.

Example 9—Large Scale Use of Carbon Adsorbent in Anaerobic Digestion of Sewage Sludge Production of the carbon adsorbent to increase the biogas and methane yield in anaerobic digestion can be done in the same way as for odour elimination or removal of other pollutants but the carbon adsorbent should be sieved below 20 nm. A mass dosage of 0.2% to 1% is added to sewage sludge before the AD reactor.

Porosity Analysis

Three typical materials found in screening waste were pyrolysed at 700° C. for 4 h into fibrous carbon products. These were Novon Cotton Wool Pads (cotton pads), Andrex Classic Clean Toilet Roll Tissue (toilet tissue) and Nivea Refreshing Facial Cleansing Wipes (wipes). Cotton pads and wipes are not intended for flushing as they don't break down in the sewers. The wipes are made from the plastic material polyester. After pyrolysis, the resulting carbon products were milled to a particle size below 125 nm.

Porosity characteristics of all three materials were determined by standard nitrogen adsorption technique, and are shown in Table 6 below.

TABLE 6

| Parameter | Unit | Carbon made from cotton pads | Carbon made from toilet tissue | Carbon made from wipes |
|---|---|---|---|---|
| BET total surface Area | $m^2/g$ | 615.9 | 549.8 | 557.9 |
| Micropore Area (<2 nm) | $m^2/g$ | 455.7 | 384.5 | 496.0 |
| Mesopore Area (2 nm-50 nm) | $m^2/g$ | 79.0 | 97.3 | 24.1 |
| Share of micropore area in total surface area | % | 74.0 | 69.9 | 88.9 |

TABLE 6-continued

| Parameter | Unit | Carbon made from cotton pads | Carbon made from toilet tissue | Carbon made from wipes |
|---|---|---|---|---|
| Total pore volume | cm³/g | 0.324 | 0.338 | 0.241 |
| Micropore volume | cm³/g | 0.184 | 0.155 | 0.193 |
| Average pore diameter | nm | 2.104 | 2.462 | 1.728 |

The three carbon materials are different from one other with regards to porous characteristics. These differences are apparent in the micro-porous characteristics and, separately, also the meso-porous characteristics of the samples. For example, toilet tissue derived carbon has a very distinct meso-pore distribution whereas carbon from wipes has negligible meso-porous character. Regarding the micro-pore character, toilet tissue derived carbon exhibited much slower adsorption than carbon from cotton pads and wipes, which suggests that the toilet tissue carbon is composed of particularly small micro-pores or has a considerably more restrictive micro-pore structure.

Figure 6:
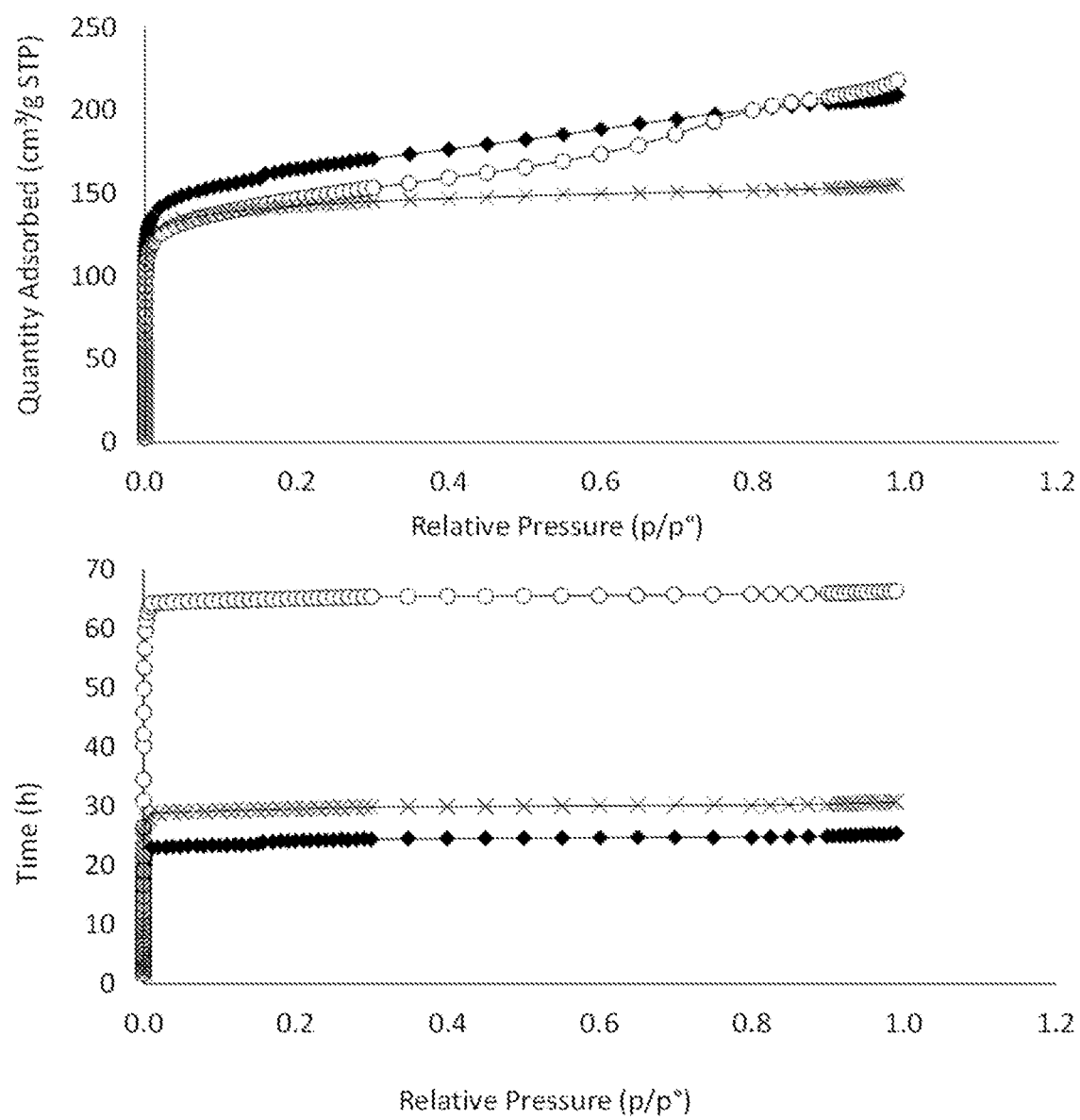
FIG. 6: Nitrogen adsorption isotherm linear plots for carbons made from cotton pads (diamonds), toilet tissue (circles), wipes (crosses) and time elapsed. Adsorbed nitrogen volume at standard temperature and pressure (STP).

This deviation in behaviour is reflected in the nitrogen adsorption and desorption isotherm linear plots of the three carbons shown in FIG. 6. These distinct porosity properties provide distinct adsorption characteristics relevant for the removal of different odour causing substances in wastewater.

Adsorption Properties Analysed by a Photometer

Figure 7:
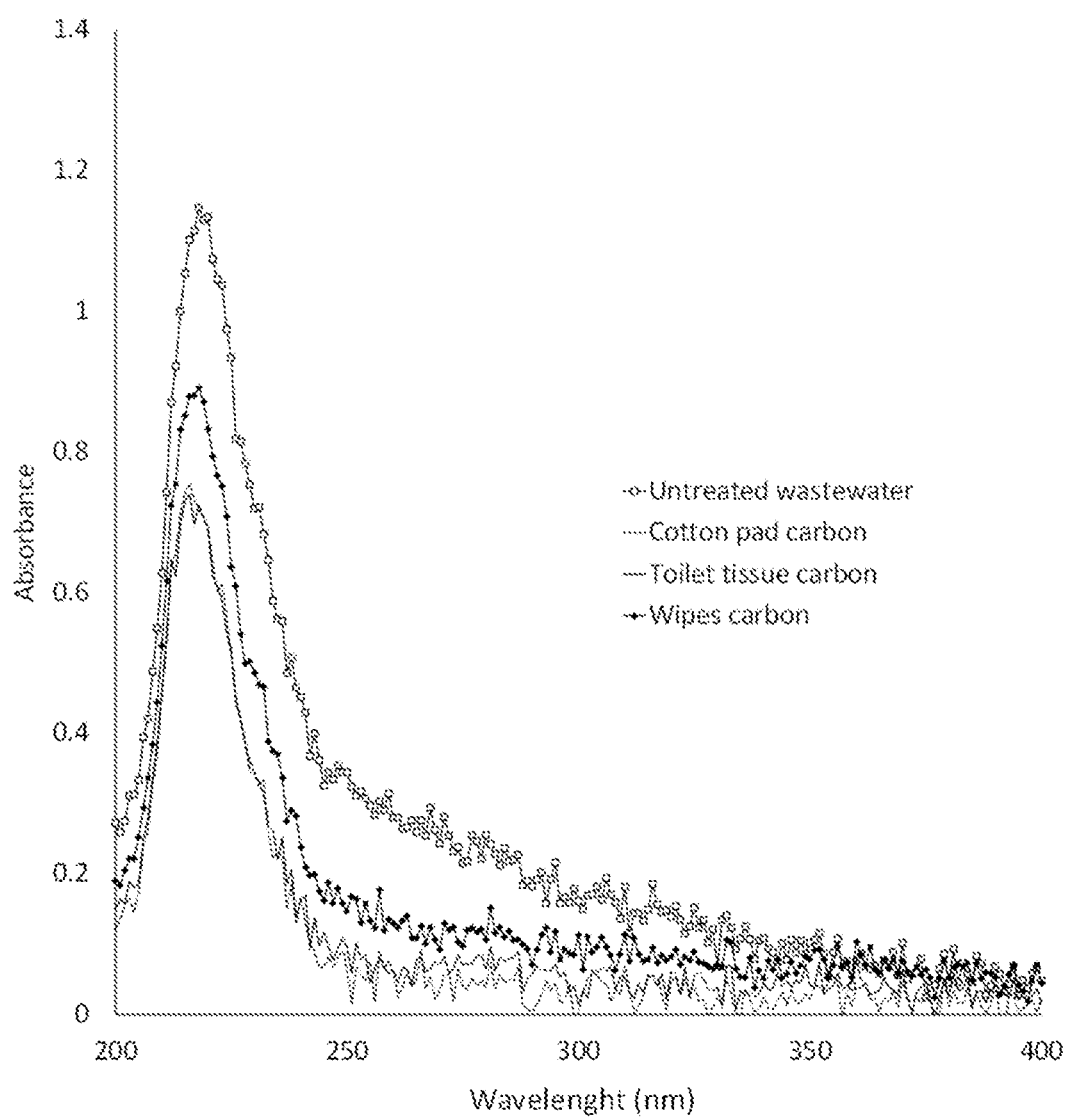
FIG. 7: UV spectra of wastewater before (untreated) and after treatment with three different carbon adsorbents. Absorbance data shown are net values achieved by subtracting the absorbance data of pure water from the total absorbance.

The same carbons as prepared for the porosity analysis were used to determine their adsorption behaviour in wastewater from Scottish Water's Seafield Wastewater Treatment Works in Edinburgh by means of UV absorbance. Therefore, 5 mL of wastewater was amended with 50 mg of each carbon absorbance and left on a shaker for 12 hours. Afterwards the suspension was filtered, and the liquid phase was analysed by a UV photometer. The absorbance spectra shown in FIG. 7 show typical characteristics for wastewater with a peak at 220 nm for nitrate and overlapping peaks for various dissolved and suspended organic substances between 250 nm and 400 nm.

It can be seen that all three carbon materials remove a wide range of substances from wastewater. Carbon made from cotton pad and toilet tissue appear to be more effective in terms of overall removal. However, all materials show distinctive characteristics in their absorbance spectra. This supports the expectation that carbons made from a mixture of materials are capable of removing a broader range of substances than carbons made from a single material.

Although the invention has been particularly shown and described with reference to particular examples, it will be understood by those skilled in the art that various changes in the form and details may be made therein without departing from the scope of the present invention.

REFERENCES

Benstoem F. et al (2018). Elimination of micropollutants by activated carbon produced from fibers taken from wastewater screenings using hydrothermal carbonization. Journal of Environmental Management 211, 278-286.

Guiotoku, M., Rambo, C. R., Hansel, F. A., Magalhaes, W. L. E., Hotza, D. (2009). Microwave-assisted hydrothermal carbonization of lignocellulosic materials. Material Letters 63, 2707-2709.

Hwang, Y., Matsuo, T., Hanaki, K., Suzuki N. (1994). Removal of odorous compounds in wastewater by using activated carbon, ozonation and aerated biofilter. Water Research 28, 2309-2319.

Kitano, Y., Okumura, M., Idogaki, M. (1978). Uptake of phosphate ions by calcium carbonate. Geochemical Journal 12, 29-37.

Li, R., Wang, J. J, Zhou, B., Zhang, Z., Liu, S., Lei, S., Xiao, R. (2017). Simultaneous capture removal of phosphate, ammonium and organic substances by MgO impregnated biochar and its potential use in swine wastewater treatment. Journal of Cleaner Production 147, 96-10 107.

The invention claimed is:

1. A method of manufacture of a particulate carbon adsorbent comprising 60 to 90% by wt. carbon, wherein the particulate carbon adsorbent is a fibrous pyrolysis product of an organic fraction of waste screenings, and wherein the fibrous pyrolysis product predominantly comprises fibers having a diameter in the range of about 10-40 μm and a length in the range of about 50-500 μm, the method comprising the steps of:
   (a) providing an organic fraction of screenings with a dry matter content of at least 50%;
   (b) pyrolysing the organic fraction of waste screenings of step (a) at a temperature in the range of 650° C. to 900° C. to obtain pyrolysed material; and
   (c) grinding the pyrolysed material of step (b).

2. The method of claim 1 further comprising the step of:
   (d) sorting the ground pyrolysed material of step (c).

3. The method of claim 2, wherein the sorting of step (d) comprises sieving or sifting the pyrolysed material resulting from step (c), optionally wherein the sieving or sifting performed in step (d) uses a screen having apertures of between about 125 μm and about 500 μm.

4. The method of claim 3, wherein step (b) is performed at a temperature of about 700° C.

5. The method of claim 2, wherein step (b) is performed at a temperature of about 700° C.

6. The method of claim 1 wherein step (b) is performed at a temperature in the range of 650-750° C.

7. The method of claim 1, wherein step (b) is performed at a temperature of about 700° C.

* * * * *